May 6, 1941.                    J. PORTEOUS                    2,241,316
                        VALVE FOR DISCHARGING CONTAINERS
                              Filed Nov. 18, 1938
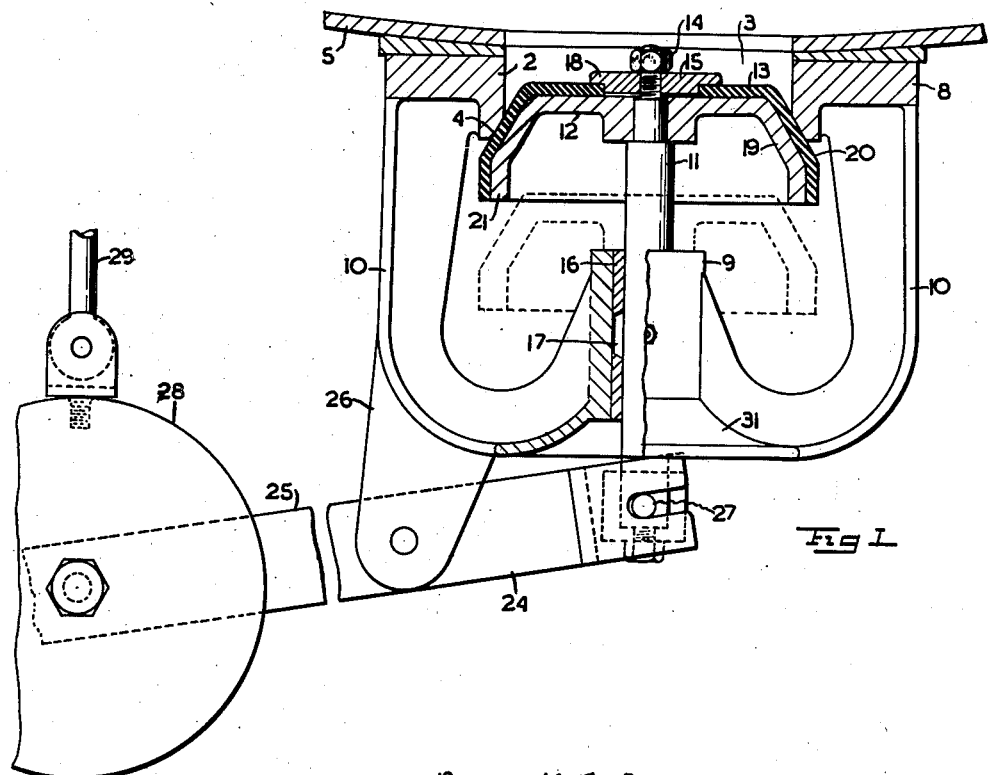
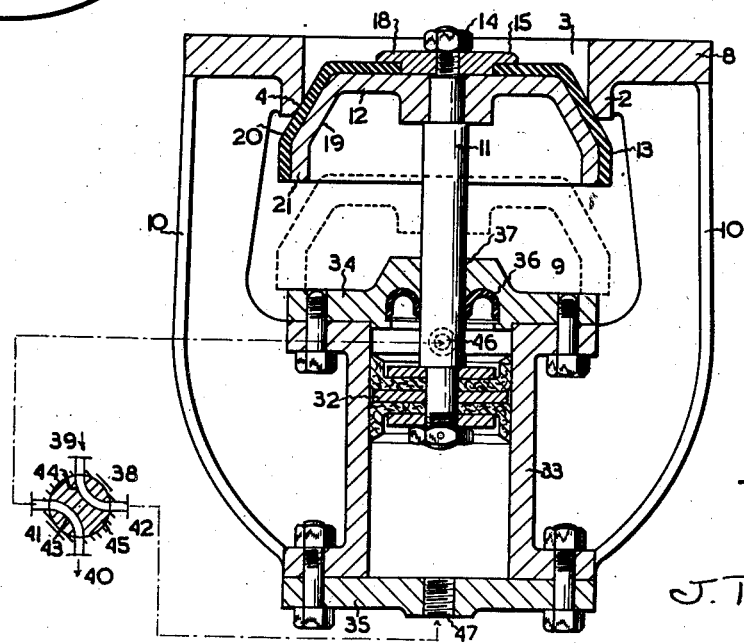
J. Porteous
       Inventor Patented May 6, 1941

2,241,316

UNITED STATES PATENT OFFICE 2,241,316

VALVE FOR DISCHARGING CONTAINERS

James Porteous, Johannesburg, Transvaal,
Union of South Africa

Application November 18, 1938, Serial No. 241,285
In the Union of South Africa May 4, 1938

1 Claim. (Cl. 137—21)

The present invention is a discharging valve adapted to be fitted to a vessel containing a fluid for the purpose of rapidly discharging the contents when the necessity for doing so arises, and particularly in an emergency. A particular use for such a valve is in the case of a vessel containing fluid pulp the solid matter of which is kept in suspension by agitation and in which, in the event of agitation failing, settlement of the solid would have inconvenient results; the valve enabling the pulp to be discharged quickly from the vessel to forestall such settlement. In the case for instance of a rotary vacuum filter for ore slime, the slime is contained in a tank into which the rotary filter member dips and which is fitted with a mechanical agitator.

For the regular operation of the filter no outlet valve for the tank is required, since the liquid constituent of the pulp passes through the filter cloth to suction pipes, while the solid is collected by the filter drum as a cake which is subsequently discharged outside the tank by means of a scraper or blow off device. However, it is necessary to provide the tank with an emergency discharge valve so that, should the motive power fail, the tank contents can be discharged before the solid constituent thereof can settle sufficiently to cause difficulties when the apparatus is re-started. The valve forming the subject-matter of this invention is specially adapted for such a purpose.

A valve according to the invention consists of a body comprising a ring defining a discharge orifice and providing a valve seat, means for attaching the ring to a container, a valve stem guide co-axial with and spaced from the ring, and an open-sided spider rigidly connecting said stem guide to the ring, and in combination with said body a closure member comprising a head co-operating with the seat and a stem movable axially in the stem guide and retractable means for forcibly holding the closure member to the seat.

Two examples of valves according to the invention are shown in the accompanying drawing in which—

Figure I is an elevation, largely sectional, of a hand actuated valve.

Figure II is a similar view of a power actuated valve.

In Figures I and II the body comprises a ring or short pipe 2, defining a discharge aperture 3 and formed at the lower end of said aperture as a conical seat 4. The valve is, in use, fitted to the base of a container, such as the tank 5 containing ore slime for filtering.

For thus fixing the valve to the container, there is shown a bolting flange 8 integral with the ring 2. Also forming part of the body of the valve are the stem guide 9 and the widely spaced spider arms 10 by which said guide is rigidly attached to the ring 2.

The closure member consists of the stem 11 and the mushroom-shaped head which may be separable from the stem 11 and secured thereto by a nut 14 and washer 15. The stem 11 slides freely and axially through the guide 9, which may be fitted with a renewable bushing 16 formed with a lubricant reservoir 17. When the spider arms 10 are integral with the ring 2 and flange 8, as shown, the closure member is assembled in position by inserting the stem 11 through the guide and into the head which has previously been inserted laterally between the spider arms 10, which are spaced at least widely enough to admit it.

The head comprises a metal shell 12 covered externally by a rubber jacket 13 which is preferably moulded to be a close fit on the shell and is retained by a flange 18 on the washer 15. The shell 12 is formed with a conical portion 19 supporting a similar conical portion 20 of the rubber jacket; which portion 20 makes contact with the seat 4. The function of the rubber jacket is to enable a tight joint to be made with the seat notwithstanding the presence of gritty matter adhering thereto, and to protect the shell itself against destruction by gritty pulp rushing out of the orifice.

The shell 12 is deeply hollow underneath so as to have a depending skirt 21 below the conical portion 19. When the closure member is lowered to open the orifice 3 it seats on the stem guide and its skirt 21 is long enough then to be lower than the top of the stem guide and so protect both the stem and the guide from the pulp or other liquid which is being discharged from the container and which may be injurious to their sliding surfaces. To enable the long skirt to descend to this extent, the spider arms 10 are extended from the ring 2 well below the top of the guide 9 and then curved upward to join the guide body.

The means provided in the construction shown in Figure I for holding the valve closed, comprises the lever 24, 25 pivoted between a pair of lugs 26 cast integral with one of the arms 10. Said lever is forked at the end of its short arm 24 to embrace the lower end of the stem 11 and is slotted to engage a pair of pins 27 projecting laterally from the lower end of the stem 11. The long arm 25 of the lever is fitted with a weight 28 which normally holds the closure member to its seat.

To said weight is fitted a member 29 such as a chain or rod which is led to some position readily accessible to the person in charge of the filter. When it is required to discharge the tank 5 by reason for instance of the filter drum having to be stopped or the agitation ceasing to operate, the operator pulls the chain or rod 29 thereby lifting the weight and allowing or causing the closure member to drop clear of the orifice. This permits the pulp in the tank to discharge by gravity through the orifice 3 with considerable freedom, since apart from the ring 2 the valve has no body to restrict the flow or to provide lodgment for the solid matter of the pulp. For the same reason there is nothing to obstruct the re-closing of the valve. A thin wad of solid matter may collect in the orifice 3 above the head but when the weight 28 is lowered, said wad is left unsupported and breaks away.

A bell shaped web 31 extends between the spider arms 10 at their lower ends and forms an umbrella for diverting pulp or liquid which may splash onto it; thereby protecting the lower end of the stem 11, and the joint between it and the lever 24.

In the form of the valve shown in Figure II, the lower end of the stem 11 is fitted with a piston 32 arranged in a cylinder 33 integral with the spider 10. The cylinder is fitted with removable end covers 34 and 35 the upper one 34 of which, together with the piston 31 forms the stem guide. Packing 36 for the stem is provided in said cover 34; and the aperture 37 of the cover 34 at which the stem 11 enters is raised so as to be fully protected against the discharging liquid by the shell 12, when the latter is lowered.

The piston 32 is normally held at the upper end of its travel by fluid under pressure, such as water or compressed air. When the valve is to be opened, the fluid below the piston is exhausted; and fluid may if desired be fed to the upper side of the piston to force it down. The distribution and exhaust of the actuating fluid to and from the cylinder ends alternately is controlled by such well known means as the rotary plug valve 38 having four casing passages 39, 40, 41 and 42 and two ports 43, 44, in its plug 45. Valve passage 39 receives pressure fluid: passage 40 exhausts the used fluid: and passages 41 and 42 are connected respectively to the pipe connection 46 of the upper cylinder chamber and the pipe connection 47 of the lower cylinder chamber.

In the position of the valve shown, pressure fluid is being admitted to the lower end of the cylinder 33 to close the discharging valve; the upper end of the cylinder being exhausted. By rotating the plug 45 through 90° the distribution of the pressure fluid is reversed and the discharging valve is opened.

I claim:

A valve for discharging containers, consisting of a body comprising a ring defining a discharge orifice and providing a valve seat, means for attaching the ring to a container, a valve stem guide co-axial with and spaced from the ring, and an open-sided spider rigidly connecting said stem guide to the ring, and in combination with said body a closure member comprising a head and a stem movable axially in the stem guide, the head being hollow and comprising a substantially cylindrical peripheral skirt extending beyond the point of junction of the stem with the head, the head seating on the stem guide when the valve is open, the upper end of the stem guide bore being then above the lower edge of the skirt so that the latter protects the stem guide, and retractable means for forcibly holding the closure member to the seat.

JAMES PORTEOUS.